United States Patent [19]

Kanota et al.

[11] Patent Number: 5,193,035
[45] Date of Patent: Mar. 9, 1993

[54] APPARATUS AND METHOD FOR PHASE CORRECTION OF A CLOCK SIGNAL BY CONTROLLING THE VARIABLE DELAYING THEREOF

[75] Inventors: Keiji Kanota; Takahito Seki, both of Kanagawa, Japan

[73] Assignee: Sony Corporation, Tokyo, Japan

[21] Appl. No.: 558,624

[22] Filed: Jul. 27, 1990

[30] Foreign Application Priority Data

Jul. 31, 1989 [JP] Japan .................................. 1-198882

[51] Int. Cl.⁵ .......................... G11B 5/09; H04N 5/78
[52] U.S. Cl. ...................................... 360/51; 360/36.1
[58] Field of Search ................. 360/26, 51, 36.1, 36.2, 360/31, 53, 46; 358/320, 325; 369/60; 371/1; 375/39, 120; 329/304

[56] References Cited

U.S. PATENT DOCUMENTS

| 4,275,466 | 6/1981 | Yamamoto | 360/51 |
| 4,399,474 | 8/1983 | Coleman, Jr. | 360/46 |
| 4,581,660 | 4/1986 | Schmidt | 360/51 |

Primary Examiner—Aristotelis Psitos
Assistant Examiner—Won Tae C. Kim
Attorney, Agent, or Firm—Alvin Sinderbrand; William S. Frommer

[57] ABSTRACT

In a playback phase correction apparatus for a video recorder, a signal level of an input signal is compared with predetermined reference levels at times according to a playback clock signal. The apparatus operates to continuously detect whether the phase of the playback clock approaches or recedes from a point in time at which the eye pattern of the input signal is at a maximum value by comparing a count value obtained from the comparison results of the reference level counts from a previous cycle with those of the current cycle. Then, the apparatus controls a playback clock delay circuit on the basis of these count values so than an optimal count value is continuously maintained, thus ensuring that the timing of the playback clock is maintained in synchronization with the maximum eye pattern interval of the input signal.

14 Claims, 6 Drawing Sheets

PLAYBACK SIGNAL

PLAYBACK SIGNAL PROCESSING CIRCUIT

PLAYBACK SIGNAL

ERROR RATE

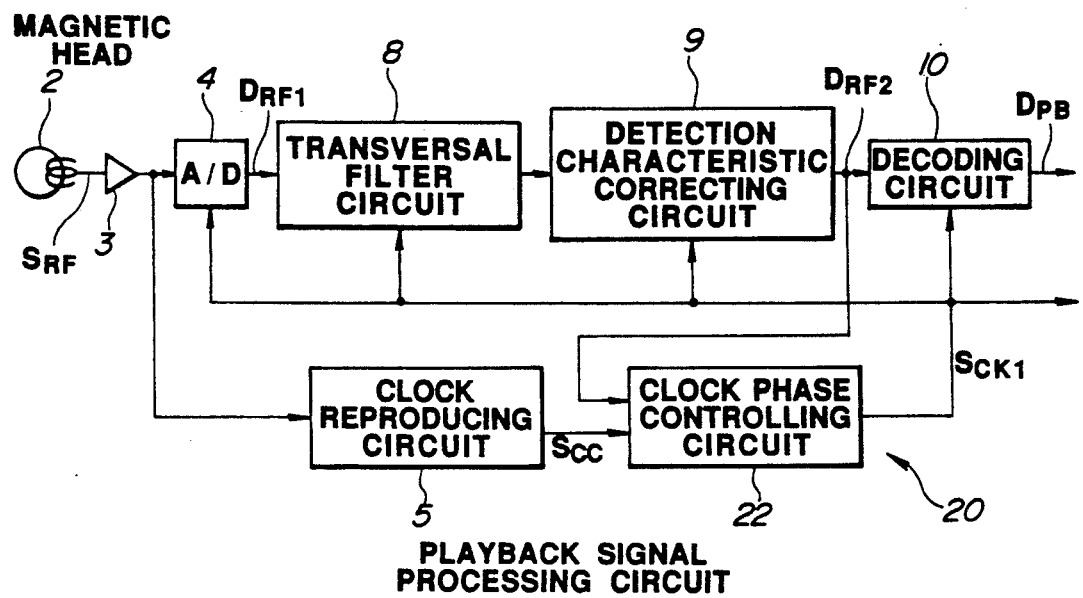
FIG. 5 PLAYBACK SIGNAL PROCESSING CIRCUIT
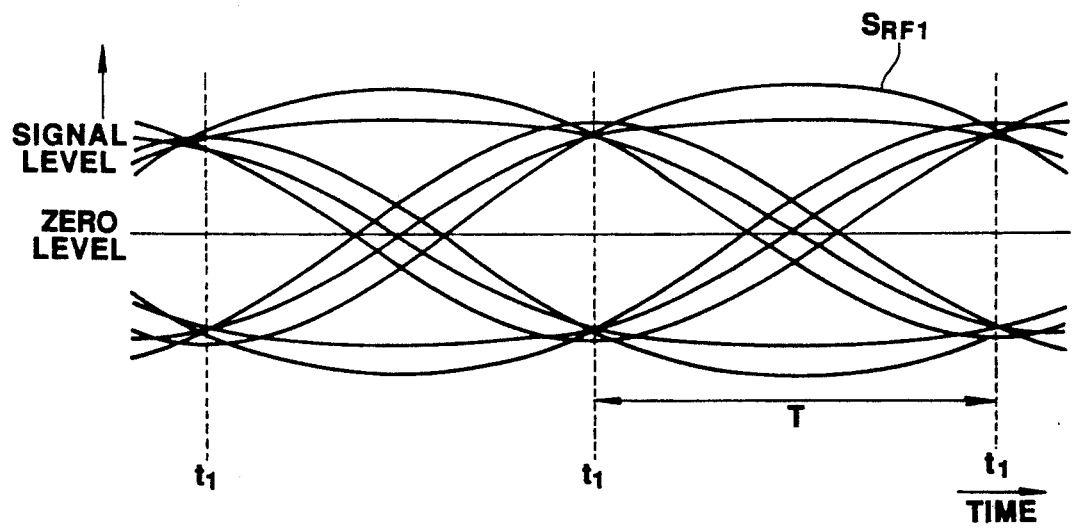
FIG. 9 PLAYBACK SIGNAL

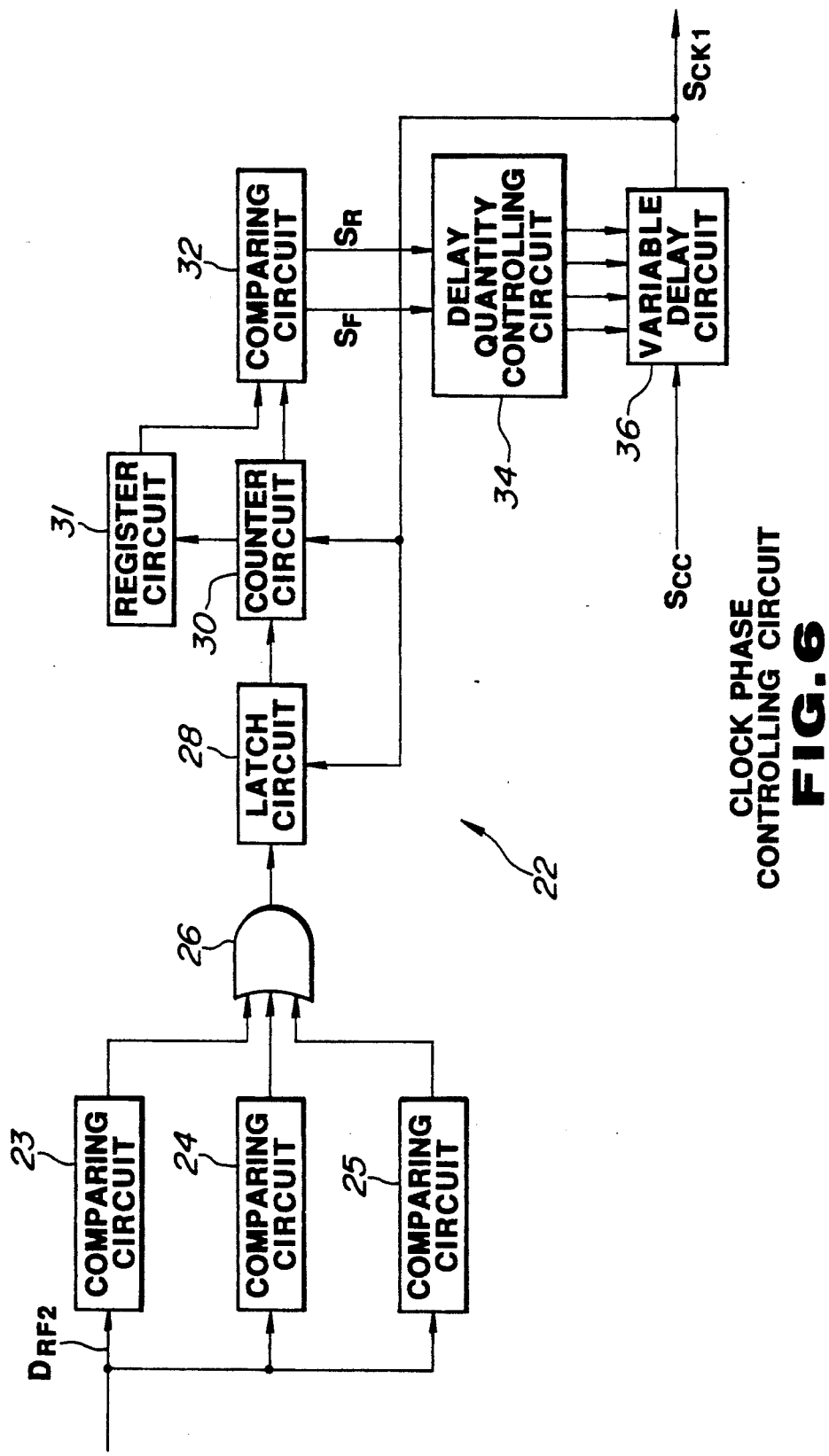
FIG. 6 CLOCK PHASE CONTROLLING CIRCUIT

PLAYBACK SIGNAL

ERROR RATE

APPARATUS AND METHOD FOR PHASE CORRECTION OF A CLOCK SIGNAL BY CONTROLLING THE VARIABLE DELAYING THEREOF

FIELD OF THE INVENTION

The present invention relates generally to a phase correction apparatus. More particularly, the present invention relates to a phase correction apparatus which, for example, may be employed in a video tape recorder.

DESCRIPTION OF THE PRIOR ART

Conventionally, a video signal in a VCR is recorded on a magnetic tape by modulating the frequency of the signal and passing the signal through a low pass filter. During a decoding, or playback operation, the modulated frequencies must be restored to their original state in order to achieve a high-quality playback signal.

In view of the foregoing, a method of recording and reproducing video signals has been developed utilizing a partial response process in which digital signals are encoded with high efficiency. A well-known partial response method which is in wide use is called a class IV partial response process. In a case where a signal is recorded using the above-mentioned class IV process, a resulting signal having an eye pattern (image density), as shown in FIG. 1, is produced.

For the purpose of clarification, a conventional playback signal decoding process will now be described with reference to FIGS. 1-4. The signal is decoded for playback by a circuit, such as that shown in FIG. 2. Basically, the signal to be played back is transmitted from a magnetic head 2 and is amplified by an amplifying circuit 3. This amplified playback signal is transmitted to an A/D (analogue/digital) converter 4, and a clock reproducing circuit 5. The clock reproducing circuit 5 generally consists of a phase-locked loop (PLL) oscillating circuit in which a reproduced clock signal is generated and a signal level of the reproduced clock signal peaks at a clock period-T. Then, a clock phase adjusting circuit 7 receives the reproduced clock signal from the clock reproducing circuit 5 so that a playback clock signal is generated n the clock phase adjusting circuit and is delayed relative to the reproduced clock signal for a period of time determined so that the peak signal level of the playback clock occurs, for example, at a time $t_1$, when the eye pattern (image density) of the video signal is at a maximum value.

In the circuit of FIG. 2, the A/D converter 4 samples the playback signal for conversion into a digital signal at each time when the playback clock signal reaches its maximum signal level, and the resulting digital playback signal is fed to a transversal filter circuit 8.

The transversal filter circuit 8 includes a digital filter circuit adapted to operate in synchronization with the playback clock signal so that a high band component of the digital playback signal that is lost at the time of recording and modulation is appropriately restored.

A detection characteristic correcting circuit 9 is provided following the transversal filter circuit 8, and is constituted by a digital filter, also adapted to operate in synchronization with the playback clock signal so that differential characteristics of the electromagnetic conversion are compensated by eliminating code interference with the incoming video signal. The characteristic detection/correction circuit 9 also sets the characteristics of the recording/reproducing system as a whole to coincide with those of the class IV partial response process.

A decoding circuit 10 which follows the characteristic detection/correction circuit 9 comprises a comparator and is also synchronized with the playback clock signal so that, when the digital playback signals rises and falls relative to a predetermined reference level, a playback data signal output from the decoding circuit 10 assumes a binary value of '1' corresponding to the digital playback signal so as to optimize the output quality of the playback.

Although it has been assumed that, in digital recording and reproducing systems, data may be copied or transferred any number of times without generation loss or loss of data quality, a certain amount of error will occur which contributes to the degradation of data quality. This error rate is related to the phase of the recording/playback clock relative to the timing of the signal output from the magnetic heads.

Although the above-described conventional circuit arrangement has hitherto been considered adequate for high-quality digital signal reproduction, such conventional systems suffer from the drawback that, as is apparent from FIGS. 3 and 4, and as stated above, the chance of errors occurring in the playback data signal rapidly increases when the phase of the playback clock signal varies in relation to the time $t_1$, at which the eye pattern of the video signal reaches a maximum value, because the original signal output from the magnetic head is likely to contain some noise component.

Therefore, there is a need for a system which continuously adjusts the phase of the playback clock signal so that the peak of that signal coincides exactly with the maximum eye pattern (time $t_1$) in the video signal.

Because signal transmission characteristics of a magnetic recording/reproducing apparatus vary every time one magnetic tape is exchanged for another, in a video tape recorder (VTR), the phase of a playback clock signal varies in relation to the material being reproduced and therefore correct phase alignment cannot be assured. Accordingly, in order to ensure that video signals are recorded and reproduced at a high density and to produce playback data having a low rate of error, the previously described clock phase adjusting circuit 7 should be closely and continuously controlled so that the playback clock signal corresponds to the time of the maximum eye pattern in the video signal.

OBJECTS AND SUMMARY OF THE INVENTION

It is accordingly one object of the present invention to avoid the above described disadvantages of the prior art.

It is another object of the present invention to provide a phase correction apparatus which can process an input signal so as to minimize phase error caused by a process by which the signal is reproduced.

It is a further object of the present invention to provide a phase correction apparatus which assures that the phase of a playback clock signal can maintain a low degree of phase error relative to an input signal irrespective of the degree of variation in signal transmission characteristics of a signal transmission system.

According to one aspect of the present invention, the above-stated objects may be achieved by employing a phase correction apparatus in which an input signal is received in response to a clock signal, and which comprises: clock signal generating means for generating a clock signal in synchronization with the input signal; playback clock signal generating means for generating a playback clock signal by using the clock signal as a reference, and delaying the playback clock signal for a predetermined period in relation to the clock signal; comparing means for comparing a signal level according to the time of the playback clock signal; counter means in which a comparison result determined by the comparing means is counted in a predetermined time period; memory means which receives a count value from the counter means and stores the value for the predetermined time period until a new count value is received from the counter means, whereupon the memory means outputs the previously held count value and stores the newly received count value; count value comparing means for receiving the previously held count value from the memory means and a current count value from the counter means in the predetermined time period, and for comparing the previously held count value with the current count value to determine a comparison value so as to produce a signal indicative of the comparison value; and, a clock phase controlling means in which a phase of the playback clock signal is controlled by changing a delay time of the signal on the basis of the comparison value signal in order to control the playback clock signal so as to allow the input signal to be received by the clock phase controlling means at a time in which an eye pattern of the input signal reaches its maximum value.

The foregoing objects of the invention may also be achieved by providing a method of correcting the phase of a playback clock signal relative to an input signal, which comprises the steps of: (a) generating a clock signal in synchronization with the input signal; (b) generating a playback clock signal using the clock signal as a reference and delaying the playback clock signal for a predetermined period in relation to the clock signal; (c) comparing a signal level of the input signal with a reference signal level according to the time of the playback clock signal; (d) counting a result of the comparison derived in step (c) at a given time interval; (e) storing a count value derived in the previous counting step (d); (f) comparing the count value derived in the previous counting step (d) with a current count value derived in the most recent counting step (d) and determining a comparison value for adjusting a phase of the playback clock signal; (g) controlling a phase of the playback clock signal by changing a delay time of the signal on the basis of the comparison value derived in step (f) to control the playback clock signal so as to allow the input signal to be received at a time when an eye pattern of the input signal reaches its maximum value.

The foregoing objects of the invention can be further achieved by providing a phase correction device for a digital video recording reproducing apparatus in which a record/playback clock is continually phase adjusted relative to an input video signal. The phase correction device comprises: clock signal generating means for generating a clock signal in synchronization with the input video signal; record/playback clock signal generating means for generating a record/playback clock signal using the clock signal as a reference, with the record/playback clock signal being delayed for a predetermined period in relation to the clock signal; comparing means for comparing a signal level of the input video signal with a reference signal level according to the time of the record/playback clock signal; counter means in which a comparison result output from the comparing means is counted in a predetermined time period; memory means for receiving a count value from the counter means and storing the value for the predetermined time period until a new count value is received from the counter means, whereupon the memory means outputs the previously held count value and stores the newly received count value; count value comparing means for receiving the previously held count value from the memory means and a current count value output from the counter means in the predetermined time period, and for comparing the previously stored count value with the current count value to determine a comparison value so as to produce a signal indicative of the comparison value; and clock phase controlling means in which a phase of the record/playback clock signal is controlled by changing a delay time of the signal on the basis of the comparison value signal to control the record/playback clock signal so as to allow the input video signal to be received by the clock phase controlling means at a time when an eye pattern of the input video signal reaches its maximum value.

The present invention will be best understood from the following detailed description of preferred embodiments when read in connection with the accompanying drawings in which corresponding parts are identified by the same references numerals.

BRIEF DESCRIPTION OF THE DRAWINGS

FIG. 5 is a block diagram which schematically shows a signal processing circuit in accordance with a preferred embodiment of the present invention;

FIG. 6 is a block diagram showing a clock phase controlling circuit to which reference will be made in describing FIG. 1;

FIGS. 9 and 10 respectively show playback signals in a case in which an integration type partial response process has been employed;

DESCRIPTION OF THE PREFERRED EMBODIMENT

The present invention will now be described in detail with reference to the accompanying drawings which illustrate the preferred embodiments thereof. An explanation of the class IV partial response process will be included in the description so that the objects and features of the present invention will become more apparent.

The circuits are described in terms of function and are not limited to any particular combination of electronic components, but may be easily fabricated by a circuit designer according to principles well understood in the art.

Figure 2:
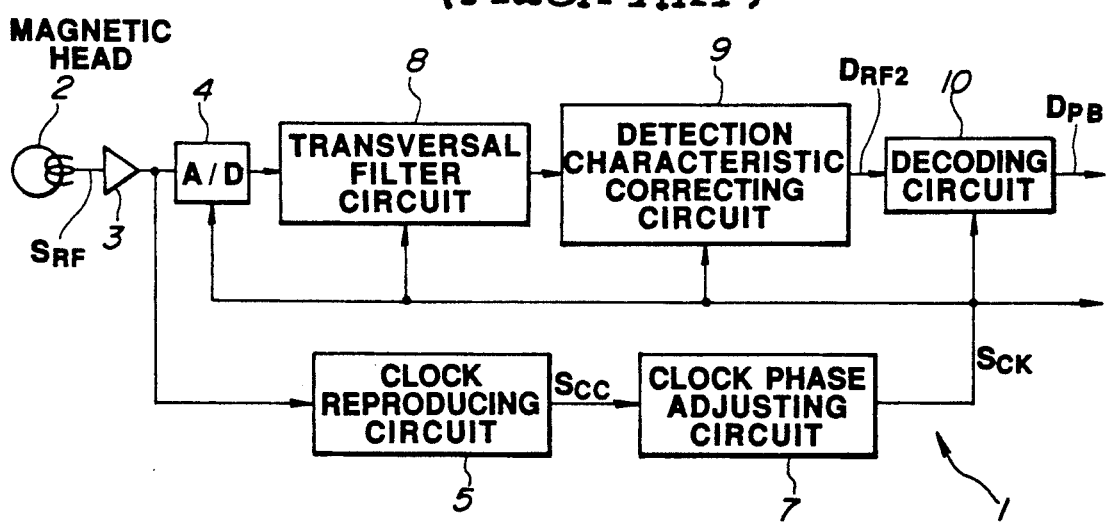
FIG. 2 is a block diagram which schematically shows a conventional playback signal processing circuit for decoding a playback signal.

Referring to FIG. 5, in which elements corresponding to those in FIG. 2 are represented by the same numerals and symbols, a playback signal processing circuit 20 is shown which is intended to reproduce digital video signals according to a class IV partial response process. During the corresponding recording operation the playback signal processing a digital signal is recorded by successively executing a calculation of the following equation:

$$\left[\frac{1}{1-D^2}\right] \text{MOD } 2 \qquad (1)$$

The symbol MOD 2 represent a remainder divided by 2 and D represents a delay.

In accordance with the differential characteristics of electromagnetic conversion, the input signal $S_{RF}$ from the playback head 2 has the characteristic $(1-D)$, in response to the recorded signal.

Therefore, in a reproducing mode, the characteristic detection/correction circuit 9 executes calculations with the characteristic $(1+D)$ in response to the digital recording signal $D_{RF1}$ after the same has been corrected in the transversal filter circuit 8, whereby the entire apparatus performs correction and electromagnetic conversion in response to the input digital signal during a playback operation in accordance with the following equation:

$$(1-D)(1+D) = 1-D^2 \qquad (2)$$

Thus, a signal transmission function is set to a value of "1", whereby the phase correction apparatus allows recording of digital video signals at a high density by effectively utilizing a frequency band of the electromagnetic system.

According to the invention, as shown in FIG. 6, the characteristic detection/correction circuit 9 transmits an identification point signal $D_{RF2}$ representing the level of the input signal $S_{RF}$ to comparators or comparing circuits 23, 24, and 25 of the clock phase controlling circuit 22. If the level, or amplitude, of the identification point signal $D_{RF2}$ exceeds a predetermined reference level $V_{REF1}$ (see FIG. 3), then the comparator or comparing circuit 23 is activated to output a logic '1' which represents a comparison result. However, if the signal $D_{RF2}$ remains in a range defined by the reference levels $V_{REF2}$ and $V_{REF3}$, the comparing circuit 24 is activated to output a logic '1' as the comparison result. In addition, if the identification point signal $D_{RF2}$ falls below a fourth reference level $V_{REF4}$, the comparing circuit 25 is activated to output a logic '1' as the comparison result.

Figure 1:
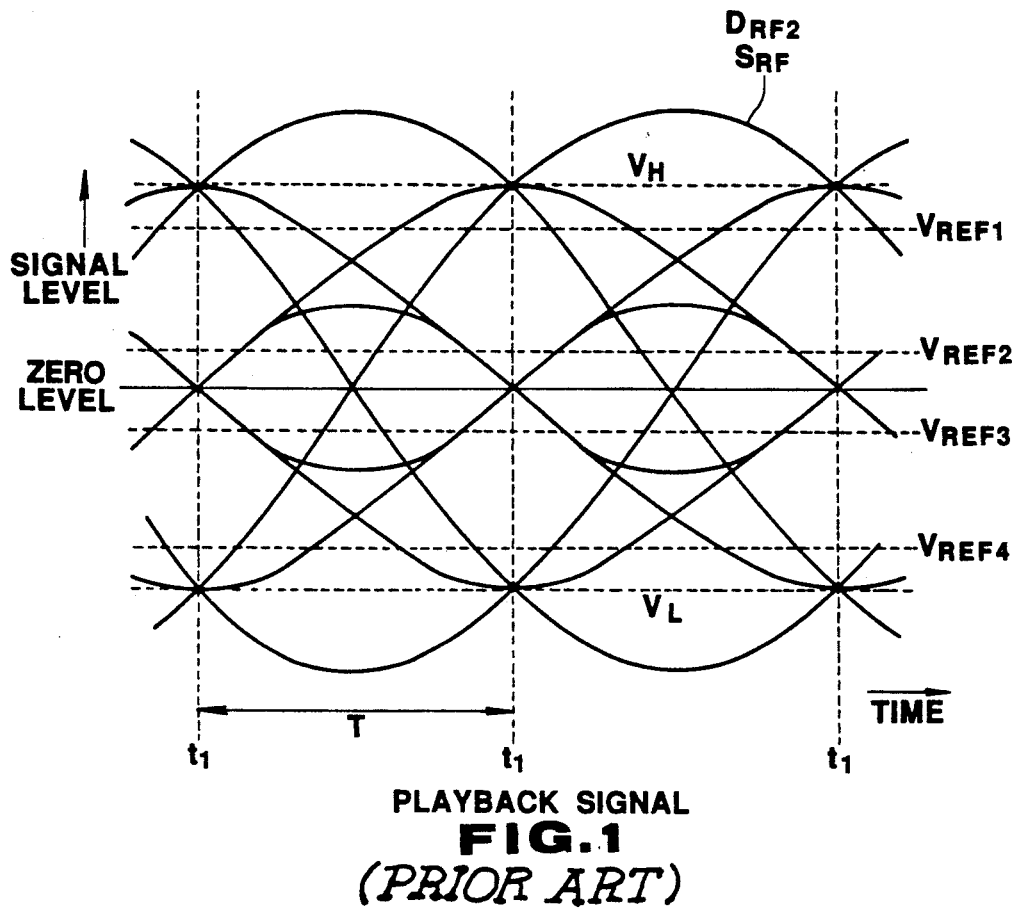
FIG. 1 is a diagrammatic view showing a plurality of signal waves (eye pattern), each illustrating a playback signal, in a case where a class IV partial response process is utilized.
Figure 3:
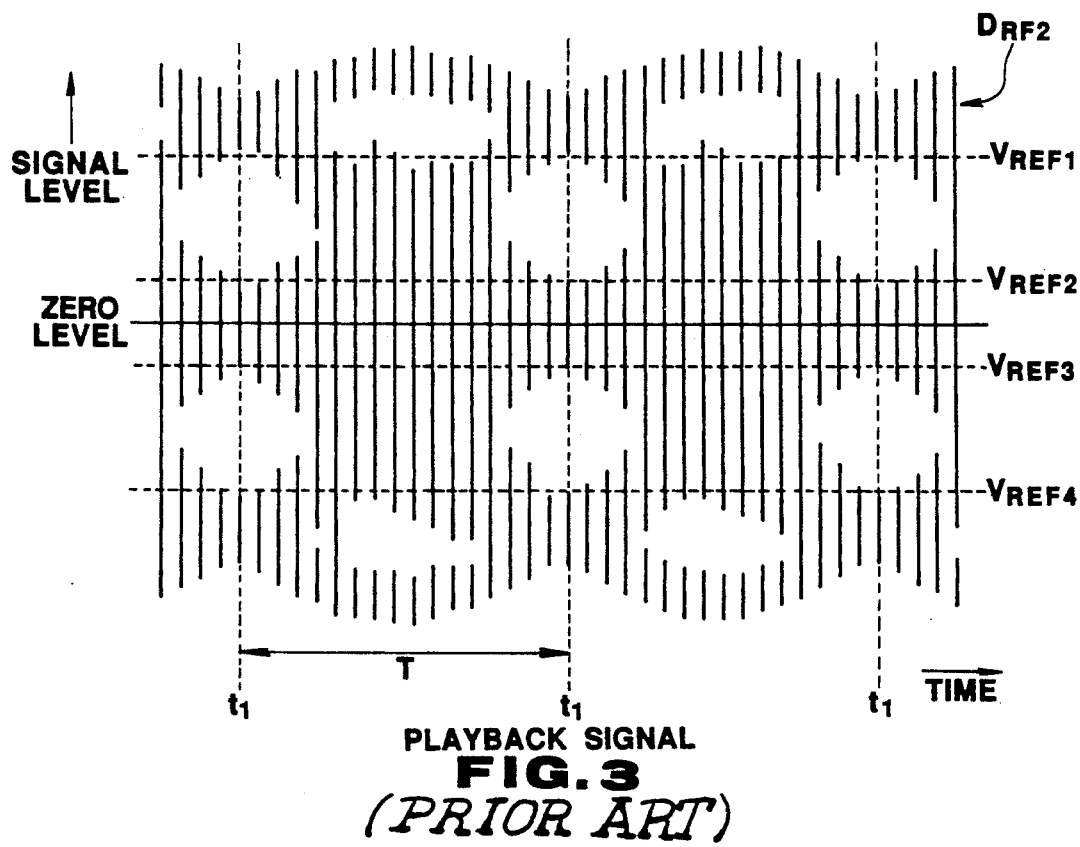
FIG. 3 is a diagram which schematically shows a playback signal derived from operations of the circuit in FIG. 2.
Figure 4:
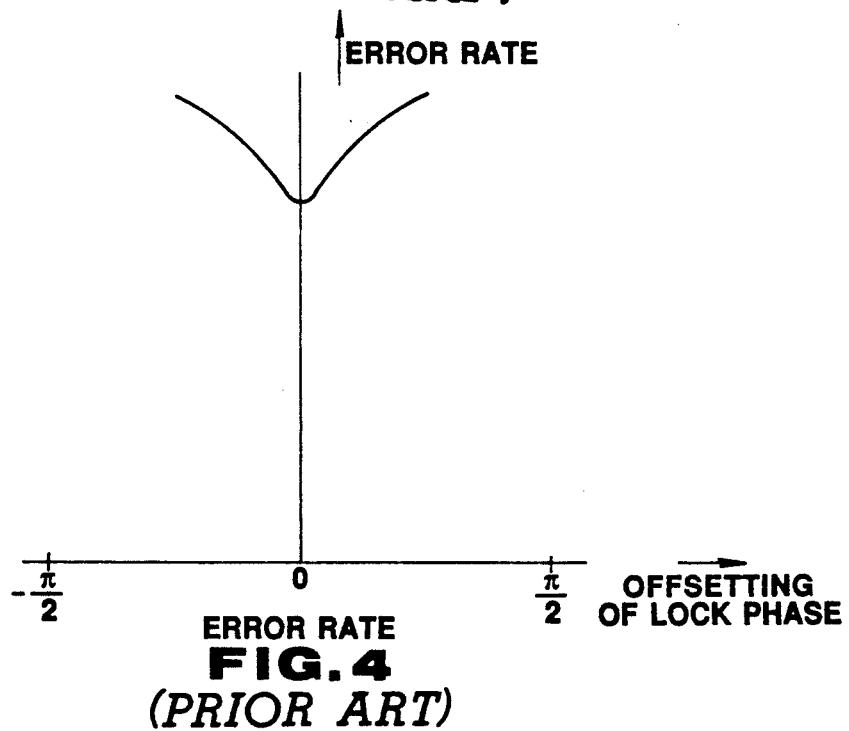
FIG. 4 is a characteristic curve illustrating an error rate.
Figure 7:
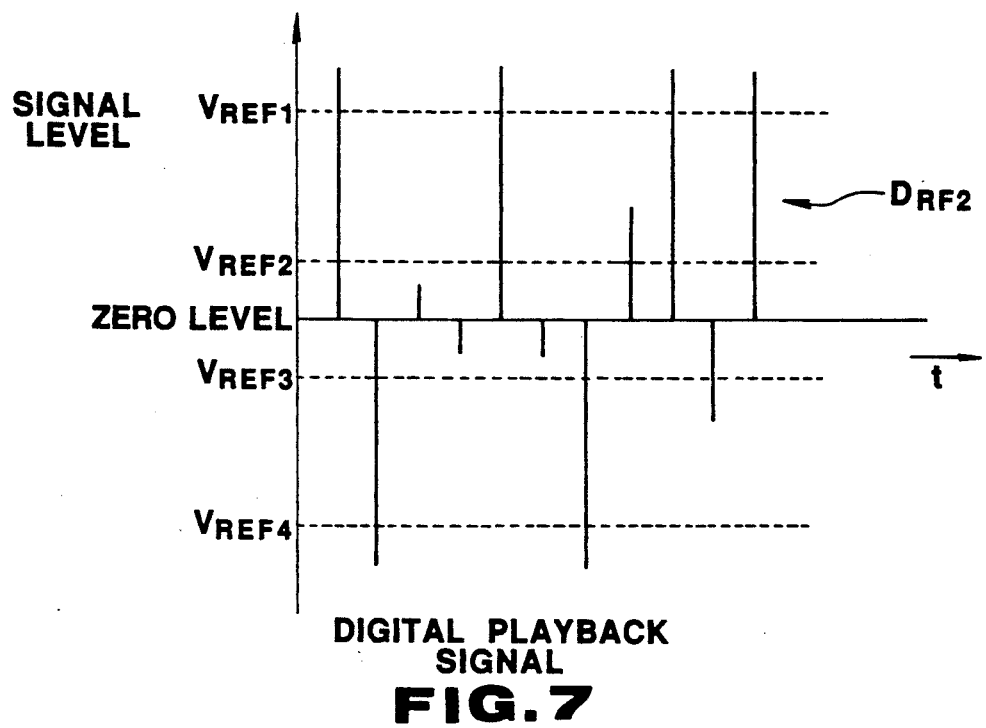
FIGS. 7 and 8 diagrammatically show signal waves which illustrate the operation of the circuits shown in FIGS. 5 and 6.

It will be noted on FIG. 3 that the reference level $V_{REF2}$ is set to a positive (+) side of a zero level and the reference level $V_{REF3}$ is symmetrically set to a negative (−) side of the zero level to an extent corresponding to a level of noise included in the input signal $S_{RF}$. The reference level $V_{REF1}$ is selectively set to a level which is lower, by the amount of the noise level, than a signal level $V_H$ (FIG. 1) which the input signal $S_{RF}$ rises above at a time $t_1$. Conversely, the reference level $V_{REF4}$ is selectively set to a level which is higher, by the amount of the noise level, than a signal level $V_L$ which the input signal $S_{RF}$ falls below at a time $t_1$. In other words, the reference levels serve to isolate the range of signal levels which contain the highest noise component.

In this manner, the input signal $S_{RF}$ is converted into the digital identification point signal $D_{RF2}$ at the time of the playback clock signal $S_{CK1}$. Thus, as shown in FIG. 3, if the pulses of the playback clock signal $S_{CK1}$ fall at the times $t_1$ when the eye pattern of the input signal $S_{RF}$ is at a maximum, that is, signal levels converge in the reference level ranges exhibiting the least noise, then the digital identification point signal $D_{RF2}$ can be obtained in such a manner that it is concentratedly distributed higher than the reference level $V_{REF1}$, within the range between the reference levels $V_{REF2}$ and $V_{REF3}$ and lower than the reference level $V_{REF4}$.

Figure 8:
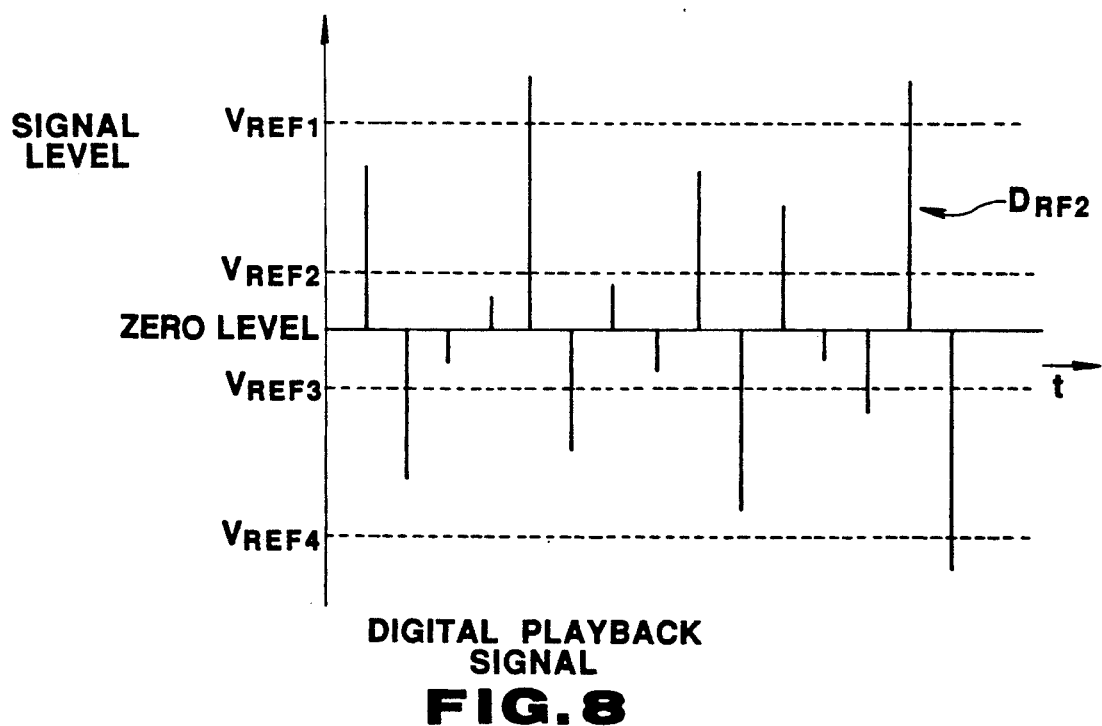

On the contrary, as shown in FIG. 8, if the timing of the pulses of the playback clock signal $S_{CK1}$ is offset from the time $t_1$, more of the digital identification point signal $D_{RF2}$ is distributed in a range between the reference levels $V_{REF1}$ and $V_{REF2}$ and between the reference levels $V_{REF3}$ and $V_{REF4}$. The concentration of this distribution increases in correspondence to the extent of the offset, thereby increasing the noise component of the recorded signal.

Referring to FIG. 6, it will be seen that an OR circuit 26 receives the comparison results derived from the comparing circuits 23, 24, and 25, and the output of the OR circuit 26 goes to a latch circuit 28 which operates in synchronization with the playback clock signal $S_{CK1}$.

A counter circuit 30 counts comparison results in the form of logic 1's which have been input via the latch circuit 28, and the count value obtained by the counter circuit 30 is output to a register 31 and to a comparing circuit 32.

According to this operation, if the playback clock signal $S_{CK1}$ is output at a time corresponding to the time $t_1$ when the eye pattern is at a maximum value, then a large count value is obtained from counter circuit 30. Conversely, if the playback clock signal $S_{CK1}$ is output at a time offset from the time $t_1$, the count value will be reduced according to the extent of the offset. As mentioned above, the counter circuit 30 outputs results derived from the counting operation to the register circuit 31 and the comparing circuit 32 at intervals of several seconds. Moreover, the counter circuit 30 causes the count value to be initialized to zero after each count has been calculated.

The register circuit 31 is continuously activated to maintain the result derived from the counter circuit 30. If a new count value is output from the latter, the register circuit 31 then outputs the previous count value to the comparing circuit 32 and thereafter maintains the newly received count value until it is subsequently replaced by a new value from the counter circuit 30. Thus, the count value derived from the current counting operation is fed to the comparing circuit 32 from the counter circuit 30, and concurrently, the count value of the previous counting operation is fed to the comparing circuit 32 from the register 31.

In this manner, the current signal level of the input signal is compared with the reference levels $V_{REF1}$ to $V_{REF4}$ at the time of the playback clock signal $S_{CK1}$. This makes it possible to detect whether or not the present phase of the playback clock signal comes close to the time $t_1$ when the eye pattern is at a maximum and the signal quality is highest.

When the present and previous count values have been input to the comparing circuit 32, the latter outputs a forward or reverse signal $S_F$ or $S_R$ to a delay quantity control circuit 34 on the basis of whether the count value is becoming closer to, or further from an optimal clock phase time.

More specifically, the reverse control signal $S_R$ is output from the comparing circuit 32 when $$D_i - D_{i+1} < D \text{ offset} \quad (3)$$

in which, $D_i$ is the count value obtained from the counter circuit during the preceding counting operation, and $D_{i+1}$ is the count value thus obtained during the present counting operation.

On the other hand, when the inequality below is established, the forward control signal $S_F$ is output from the comparing circuit 32.

$$D_i - D_{i+1} > D \text{ offset} \quad (4)$$

Next, the delay quantity control circuit 34, upon the control signal $S_R$ or $S_F$ from the comparing circuit 32, suitably controls a variable delay circuit 36 so that the phase of a clock signal $S_{CC}$ input to the variable delay circuit from the clock reproducing circuit 5 (FIG. 5) is adjusted thereby to provide the playback clock signal $S_{CK1}$ or the output from circuit 36. This arrangement of the delay quantity controlling circuit 34 and the variable delay circuit 36 ensures that the pulses of the playback clock signal $S_{CK1}$ will occur at the times $t_1$ at which the eye pattern is maximum.

When a video recorder (not shown) starts its reproducing operation the delay quantity control circuit 34 causes the variable delay circuit 36 to provide a predetermined reference delay time for a predetermined period of time.

When neither the reverse control signal $S_R$ nor the forward control signal $S_F$ is input into the delay quantity control circuit 34, the latter causes circuit 36 to maintain its reference delay time. However, when the forward control signal $S_F$ is received, the delay time is increased, or if the reverse signal $S_R$ is received, the delay time is shortened.

In this way, the phase of the playback clock signal $S_{CK1}$ is continuously maintained such that the identification point signal $D_{RF2}$ is concentratedly distributed in regions higher than $V_{REF1}$, between $V_{REF2}$ and $V_{REF3}$ (in the vicinity of the zero level), and below $V_{REF4}$ whereby the highest signal quality (lowest error rate) can be assured.

Additionally, the input signal $S_{RF}$ from head 2 is converted into a digital signal in synchronism with the playback clock signal $S_{CK1}$ at the A/D converter 4 and the resultant digital playback signal $D_{RF}$ is properly corrected in the transverse filter circuit 8 and the detection characteristic correcting circuit 9.

Therefore, for example, even in the case where the magnetic tape is exchanged with another one, thereby changing the signal transmission characteristics, the phase of the playback clock signal can always be controlled for maintaining the lowest rate of error. Consequently, playback data $D_{PB}$ of low error rate can be obtained from the decoding circuit 10 while recording and reproducing digital video signals at high density.

The present invention has been described with reference to a preferred embodiment thereof in which the signal density is concentrated in three ranges; that is, above $V_{REF1}$, between $V_{REF2}$ and $V_{REF3}$ and below $V_{REF4}$. However, the invention may be alternatively embodied in a phase correction apparatus in which the signal density is concentrated in another way, for example, only in ranges above $V_{REF1}$ and below $V_{REF4}$, respectively.

Further, in the specifically described embodiment, the delay time in circuit 36 is controlled so as to increase the count value from circuit 30 for reducing the phase error. However, if the point identification signal $D_{RF2}$ is alternatively distributed in ranges between $V_{REF1}$ and $V_{REF2}$, and between $V_{REF3}$ and $V_{REF4}$, respectively, the delay time may be controlled so as to reduce the count value for reducing the phase error.

Figure 10:
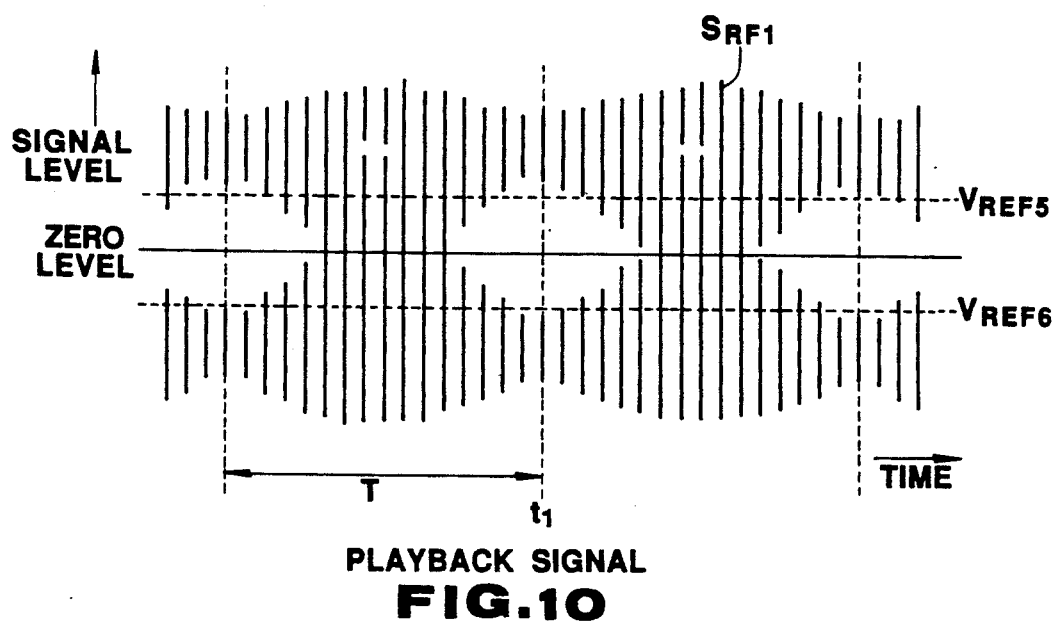
Figure 11:
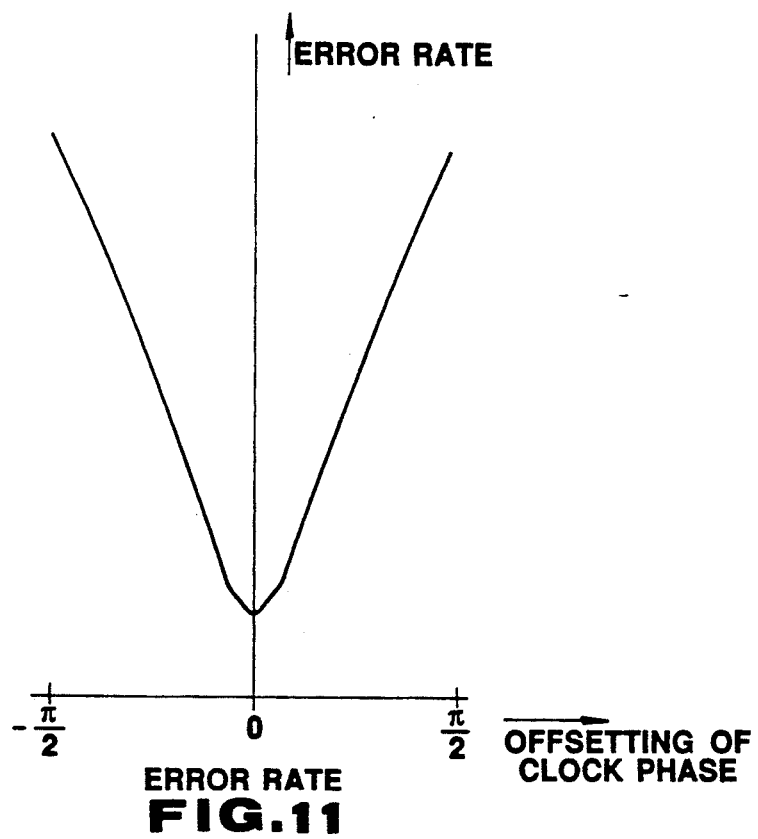
FIG. 11 is a characteristic curve illustrating an error rate when signal processing is effected according to this invention.

Additionally, although the invention has been described in terms of a class IV partial response process, it need not be limited to this process. The invention may also be preferably applied to any one of various digital recording/reproducing processes, such as an integration type search process or the like. For example, in a case where an integration type search process is utilized, as shown in FIGS. 9 to 11, an eye pattern, the center of which is located at a zero level, can be obtained in response to an input signal $S_{RF1}$ generated by the reproducing magnetic head. In this case the error rate Varies in correspondence to variation of the phase of the playback clock signal $S_{CK1}$ in the same manner as in the class IV process. Therefore, when utilizing an integration type search process, the playback clock signal $S_{CK1}$ can be held to a low phase error rate by controlling the phase of the signal $S_{CK1}$ so that the identification point signal $D_{RF2}$ is concentratedly distributed in ranges higher than a reference level $V_{REF5}$, and lower than a reference level $V_{REF6}$, respectively, (FIG. 10). Such reference levels $V_{REF5}$ and $V_{REF6}$ are determined in dependence on the contour of the eye pattern from the magnetic head signal $S_{RF1}$.

Finally, though the invention has been described with reference to the case where digital video signals are reproduced, the processing apparatus embodying the present invention may be widely employed in cases where, for example, various types of digital signals are recorded, reproduced or transmitted. In the specifically described embodiment, the signal $S_{CK1}$ is referred to as a playback clock signal, but this signal may also be utilized in the recording and/or transmitting of an input signal.

Although specific embodiments of the invention have been described in detail with reference to the accompanying drawings, it should be appreciated that the invention is not limited to those specific embodiments, and that various changes and modifications can be effected therein by one skilled in the art without departing from the scope and spirit of the invention as set out in the appended claims.

What is claimed is:

1. A phase correction apparatus for an input signal having an eye-pattern, comprising:
   clock signal generating means for receiving said input signal and generating a clock signal in synchronization with said input signal;
   clock signal delaying means for variably delaying said clock signal and providing therefrom a playback clock signal;
   signal level comparing means for comparing a signal level of said input signal with a predetermined reference signal level and providing a corresponding output at times determined by said playback clock signal;

counter means for counting each said output from said signal level comparing means occurring in a predetermined time period;

memory means for storing a count value from said counter means at completion of each said predetermined time period and for holding said count value, as a previous count value, until a new count value is received from said counter means at completion of a next said predetermined time period, whereupon the memory means outputs said previous count value and stores the new count value;

count value comparing means for comparing said previous count value from said memory means and a current count value output from said counter means during said predetermined time period and determining a comparison value signal indicative of a comparison of said previous count value and said current count value; and means for controlling the variable delaying of said clock signal by said clock signal delaying means in accordance with said comparison value signal and thereby controlling a phase of said playback clock signal so that pulses of said playback clock signal occur at times when said eye pattern of said input signal reaches a maximum value.

2. A phase correction apparatus as set forth in claim 1, wherein said signal level comparing means comprises a plurality of comparators for comparing said signal levels of said input signal with respective different predetermined reference signal levels.

3. A phase connection apparatus as set forth in claim 1, wherein said input signal is a video signal.

4. A phase correction apparatus as set forth in claim 1, in combination with processing means for performing class IV partial response digital processing on said input signal, and thereby providing said signal level of said input signal which is compared with the predetermined reference signal level.

5. A phase correction apparatus as set forth in claim 1, in combination with processing means for performing integration search type digital processing on said input signal, and thereby providing said signal level of said input signal which is compared with the predetermined reference signal level.

6. A method of correcting a phase of a playback clock signal relative to an input signal having an eye-pattern, comprising the steps of:

generating a clock signal in synchronization with said input signal;

variably delaying said clock signal to provide said playback clock signal;

comparing a signal level of said input signal with a predetermined reference signal level at times determined by said playback clock signal for providing respective comparison results;

counting each of said comparison results occurring in a predetermined time interval for providing a respective count value;

memorizing said count value obtained in a previous counting time interval;

comparing said count value obtained in a previous counting time interval with a current count value obtained in a current counting time interval and determining therefrom a comparison value; and controlling the variable delaying of said clock signal in accordance with said comparison value so that pulses of said playback clock signal occur at times when said eye pattern of said input signal reaches its maximum value.

7. The method as set forth in claim 6, wherein said step of comparing a signal level of said input signal with a predetermined reference signal level compares said signal level of said input signal with a plurality of different reference signal levels.

8. The method as set forth in claim 6, wherein said input signal is a video signal.

9. The method as set forth in claim 6, wherein said method is utilized in a class IV partial response process.

10. The method as set forth in claim 6, wherein said method is utilized in an integration search type digital process.

11. A phase correction device for a digital video recording/reproducing apparatus in which a record/playback clock signal is continually phase adjusted relative to an input video signal having an eye pattern, comprising:

clock signal generating means for receiving said input video signal and generating a clock signal in synchronization with said input video signal;

clock signal delaying means for variably delaying said clock signal and providing therefrom said record/playback clock signal;

signal level comparing means for comparing a signal level of said input video signal with a predetermined reference signal level and providing a corresponding output at times determined by said record/playback clock signal;

counter means for counting each said output from said signal level comparing means occurring in a predetermined time period;

memory means for storing a count value from said counter means at completion of each said predetermined time period and for holding said count value, as a previous count value, until a new count value is received from said counter means at the completion of a next predetermined time period, whereupon the memory means outputs said previous count value and stores the new count value;

count value comparing means for comparing said previous count value from said memory means and a current count value output from said counter means during said predetermined time period and determining a comparison value signal indicative of a comparison of said previous count value and said current count value; and means for controlling the variable delaying of said clock signal by said clock signal delaying means in accordance with said comparison value signal and thereby controlling a phase of said record/playback clock signal so that pulses of said record/playback clock signal occur at times when said eye pattern of said input video signal reaches a maximum value.

12. A phase correction device for a digital video recording/reproducing apparatus as set forth in claim 11, wherein said signal level comparing means comprises a plurality of comparators for comparing said input video signal to different respective predetermined reference signal levels.

13. A phase correction device for a digital video recording/reproducing apparatus as set forth in claim 11, in combination with processing means for performing class IV partial response digital processing on said input video signal, and thereby providing said signal level of said input video signal which is compared with the predetermined reference signal level.

14. A phase correction device for a digital video recording/reproducing apparatus as set forth in claim 11, in combination with processing means for performing integration search type digital processing on said input video signal, and thereby providing said signal level of said input video signal which is compared with the predetermined reference signal level.

* * * * *